US010314222B2

United States Patent
Demiter et al.

(10) Patent No.: US 10,314,222 B2
(45) Date of Patent: Jun. 11, 2019

(54) FIELD COMPUTER WITH INTEGRATED HIDDEN LIGHTBAR FOR VEHICLE GUIDANCE

(71) Applicant: Ag Leader Technology, Inc., Ames, IA (US)

(72) Inventors: Roger Demiter, Story City, IA (US); Travis Campbell, Ames, IA (US); Brett Johnson, Ames, IA (US)

(73) Assignee: Ag Leader Technology, Inc., Ames, IA (US)

(*) Notice: Subject to any disclaimer, the term of this patent is extended or adjusted under 35 U.S.C. 154(b) by 144 days.

(21) Appl. No.: 15/149,369

(22) Filed: May 9, 2016

(65) Prior Publication Data

US 2017/0322656 A1    Nov. 9, 2017

(51) Int. Cl.
| | |
|---|---|
| A01B 69/00 | (2006.01) |
| G06F 1/16 | (2006.01) |
| G06Q 50/02 | (2012.01) |
| G09G 3/00 | (2006.01) |

(52) U.S. Cl.
CPC ............ A01B 69/00 (2013.01); G06F 1/165 (2013.01); G06F 1/1637 (2013.01); G06F 1/1684 (2013.01); G06Q 50/02 (2013.01); G09G 3/00 (2013.01)

(58) Field of Classification Search
CPC ........ G06F 3/0412; G06F 2203/04103; G06F 2203/04112; G06F 1/1637; G06F 1/165; G06F 1/1684; G02F 1/13338; A10B 69/00
See application file for complete search history.

(56) References Cited

U.S. PATENT DOCUMENTS

| | | | |
|---|---|---|---|
| 6,463,930 B2 * | 10/2002 | Biondi | A61M 16/00 128/204.18 |
| 6,567,747 B1 * | 5/2003 | Lange | A01B 15/20 340/440 |
| 8,409,124 B2 * | 4/2013 | Steffens | A61M 1/10 604/4.01 |

(Continued)

FOREIGN PATENT DOCUMENTS

CN       202266937 U  *  6/2012

OTHER PUBLICATIONS

"Topcon X30 Seeding Controller." Air Seeders and Tillage-Simplicity Australia, (c) 2015 Simplicity Australia—Manufacturers of Australia's Favourite Airseeder, www.simplicityaus.com.au/controller_topcon.htm.*

(Continued)

*Primary Examiner* — Ricardo Osorio
(74) *Attorney, Agent, or Firm* — Goodhue, Coleman & Owens, P.C.

(57) ABSTRACT

A field computer for use in an agricultural vehicle is provided. The field computer includes a housing, a processor disposed within the housing, a touchscreen display operatively connected to the housing and the processor and forming an outer surface of the field computer, and a light bar comprising a plurality of lighting elements arranged in a line on the field computer. The lighting elements of the light bar are positioned such that the lighting elements remain hidden when not in use. The field computer is configured to provide feedback associated with operation of the agricultural vehicle by lighting one or more of the lighting elements in the light bar.

18 Claims, 5 Drawing Sheets

(56) References Cited

U.S. PATENT DOCUMENTS

| | | | | |
|---|---|---|---|---|
| 9,497,898 B2* | 11/2016 | Dillon | ................... | A01D 90/10 |
| 9,575,507 B1* | 2/2017 | Jones | ................... | G06F 1/1626 |
| 2002/0063909 A1* | 5/2002 | Chino | ................... | B41J 2/465 |
| | | | | 358/509 |
| 2002/0072851 A1* | 6/2002 | Ahearn | ................ | A01B 69/007 |
| | | | | 701/483 |
| 2005/0171693 A1* | 8/2005 | Lange | ................. | G05D 1/0278 |
| | | | | 701/23 |
| 2005/0194163 A1* | 9/2005 | Wray | ................... | A01B 69/008 |
| | | | | 172/811 |
| 2008/0269956 A1* | 10/2008 | Dix | ..................... | A01B 69/008 |
| | | | | 701/1 |
| 2008/0283603 A1* | 11/2008 | Barron | .................... | G06K 7/14 |
| | | | | 235/454 |
| 2010/0023229 A1* | 1/2010 | Chiocco | .............. | A01B 69/003 |
| | | | | 701/50 |
| 2012/0154408 A1* | 6/2012 | Yukawa | ................ | G06F 1/1601 |
| | | | | 345/473 |
| 2012/0206050 A1* | 8/2012 | Spero | ..................... | B60Q 1/04 |
| | | | | 315/152 |
| 2012/0229332 A1* | 9/2012 | Vollath | ................. | G01S 19/23 |
| | | | | 342/357.25 |
| 2014/0379868 A1* | 12/2014 | Nault | ................ | G06F 17/30165 |
| | | | | 709/219 |
| 2015/0158245 A1* | 6/2015 | Jarvis | ...................... | B29C 65/08 |
| | | | | 428/426 |
| 2016/0041672 A1* | 2/2016 | Hoen | ..................... | G06F 3/041 |
| | | | | 345/173 |
| 2016/0041803 A1* | 2/2016 | Markov | ................. | A01B 76/00 |
| | | | | 701/48 |
| 2016/0161070 A1* | 6/2016 | Ellis | ......................... | F21S 4/28 |
| | | | | 362/183 |
| 2016/0257248 A1* | 9/2016 | Lisseman | ............... | B60K 37/06 |
| 2016/0305085 A1* | 10/2016 | Ranew, Jr. | ................ | E02F 5/12 |
| 2017/0131959 A1* | 5/2017 | Di Federico | ............ | G06F 3/147 |
| 2018/0029534 A1* | 2/2018 | De Wind | ............... | B60K 35/00 |

OTHER PUBLICATIONS

Image of the Samsung Galaxy S3 Smartphone.

Topcon, topconpa.com: "Precision Agriculture Solutions" (2014), p. 1-40.

www.trimble.com/agriculture, "CFX-750 Display", (2010-2014), p. 1-2.

\* cited by examiner

FIELD COMPUTER WITH INTEGRATED HIDDEN LIGHTBAR FOR VEHICLE GUIDANCE

FIELD OF THE INVENTION

The present invention relates to vehicle guidance. More particularly, but not exclusively, the present invention relates to vehicle guidance associated with agricultural vehicles and the use of light bars.

BACKGROUND

Conventionally, a light bar provides a visual feedback to the user for manually steering an agricultural vehicle such as a tractor, applicator, or harvester vehicle along a calculated path of travel. In addition to providing vehicle guidance for manually steering the vehicle on the desired path, the integrated light bar indicator also provides feedback of the position of the vehicle relative to the calculated path of travel in an automated steering system.

Although lightbar systems vary, a lightbar display may be made of a single horizontal row of lights. The center light which may be a different color or shape than other lights indicates that the vehicle is tracking the correct path. If the vehicle deviates from this path, lights to one side or the other of the center light will activate. Generally, the lights indicate which way to steer the vehicle. Thus, if the vehicle is left of the desired path, lights to the right of center will activate to indicate to the operator that they should correct by steering right.

Thus, although lightbars are known there are various issues with their use. One problem relates to the complexity and number of different user displays and control to be used by an operator of an agricultural vehicle. Where a field computer is present in addition to the lightbars this may be problematic for an operator to both read the display of the field computer as well as the lightbar in addition to maintaining all necessary awareness associated with operating the vehicle. This problem may be heightened depending upon where the field computer is mounted and where the light bar is mounted. Therefore, despite the use of light bars, problems remain.

SUMMARY

Therefore, it is a primary object, feature, or advantage of the present invention to improve over the state of the art.

It is a further object, feature, or advantage of the present invention to provide a field computer with an integrated lightbar display with functional and aesthetic benefits.

It is a still further object, feature, or advantage of the present invention to provide a field computer with an integrated lightbar display where the lighting elements remain masked or hidden when not illuminated.

Another object, feature, or advantage is to combine functionality of a field computer and a light bar display in a manner which is aesthetically pleasing.

Yet another object, feature, or advantage is to combine functionality of a field computer and a light bar display in a manner which removes potential distractions from an operator's awareness.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

According to one aspect, a field computer for use in an agricultural vehicle is provided. The field computer includes a housing, a processor disposed within the housing, a touchscreen display operatively connected to the housing and the processor and forming an outer surface of the field computer, and a light bar comprising a plurality of lighting elements arranged in a line on the field computer. The lighting elements of the light bar are positioned such that the lighting elements remain hidden when not in use. The field computer is configured to provide feedback associated with operation of the agricultural vehicle by lighting one or more of the lighting elements in the light bar. The lighting elements may be arranged in a horizontal row or a vertical column. The feedback may show variance from a desired parameter such as a desired path, a desired depth, or a desired grade.

According to another aspect, a field computer for use in an agricultural vehicle is provided. The field computer may include a housing, a processor disposed within the housing, a touchscreen display operatively connected to the housing and the processor and forming a front of the field computer, a light bar comprising a plurality of lighting elements arranged in a line on the field computer, and a layer of glass forming a surface of the touchscreen display and extending beyond the touchscreen display over the plurality of lighting elements of the light bar to thereby provide a dead front. The field computer is configured to provide feedback associated with operation of the agricultural vehicle by lighting one or more of the lighting elements in the light bar. The field computer may include masking associated with the lighting elements to mask presence of the lighting elements unless the lighting elements are illuminated. The touchscreen display may include a liquid crystal display (LCD) panel and a layer of glass extending beyond the LCD panel to provide an extended glass area. Opaque paint may be applied to the extended glass area with semi-transparent masks at locations for the lighting elements to allow for light to be emitted from the lighting elements through the semi-transparent masks. Diffusion film may be applied at the locations for the lighting elements to diffuse and spread light emitted. The line may be a horizontal row or vertical column or other line or arrangement. The feedback may be in the form from a desired parameter such as a desired path, depth, or grade.

According to one aspect, a field computer for use in an agricultural vehicle is provided. The field computer may include a housing, a processor disposed within the housing, a touchscreen display operatively connected to the housing and the processor and forming an outer surface of the field computer, and a light bar comprising a plurality of lighting elements arranged in a row on the field computer. The lighting elements of the light bar are positioned such that the lighting elements remain hidden when not in use. The field computer may be configured to indicate whether the agricultural vehicle is on a desired path by lighting one or more of the lighting elements in the light bar. There may be masking associated with the lighting elements to mask presence of the lighting elements unless the lighting elements are illuminated. The touchscreen display may include a liquid crystal display (LCD) panel and a layer of glass extending beyond the LCD panel to provide an extended glass area which the lighting elements may be positioned under. Opaque paint or other coating may be applied to the extended glass area with semi-transparent masks at locations for the lighting elements to allow for light to be emitted from the lighting elements through the semi-transparent masks. In addition, diffusion film may be applied at the locations for the lighting elements to diffuse and spread light emitted.

According to another aspect, a field computer for use in an agricultural vehicle is provided. The field computer includes a housing, a processor disposed within the housing, a touchscreen display operatively connected to the housing and the processor and forming a front of the field computer, and a light bar comprising a plurality of lighting elements arranged in a row on the field computer. The field computer further includes a layer of glass forming a surface of the touchscreen display and extending beyond the touchscreen display over the plurality of lighting elements of the light bar to thereby provide a dead front. The field computer is configured to indicate whether the agricultural vehicle is on a desired path by lighting one or more of the lighting elements in the light bar.

BRIEF DESCRIPTION OF THE DRAWINGS

FIG. 4 illustrates a field computer where all of the lighting elements are on.

DETAILED DESCRIPTION

A precision agriculture field computer is typically a computing device with an associated display, often a touchscreen, which communicates with a GPS receiver and may be used for various purposes which may depend upon the particular agricultural vehicle or associated agricultural implement.

The present invention provides for an improved field computer which includes an integrated light bar. Not only is the light bar integrated into the field computer but also it is integrated in a manner so as to hide lighting elements of the integrated light bar when not in use (illuminated). This is advantageous for aesthetic as well as functional reasons. Aesthetically, a clean and uncluttered appearance may be provided when the lightbar is not in use. Functionally, an operators attention may be focused on the display screen when guidance is not enabled (lightbar indicator is off), and inversely, attention is only drawn to the lightbar when guidance is enabled (light bar indicator is on) thereby removing potential distractions from the operators awareness.

Figure 1:
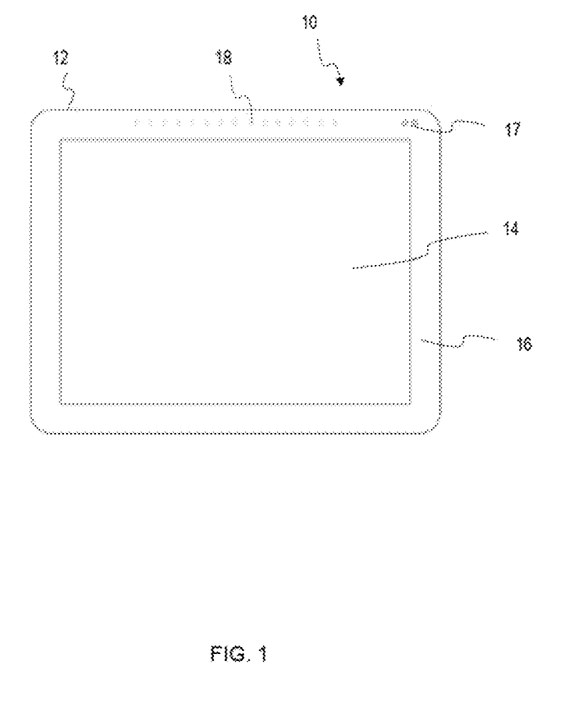
FIG. 1 illustrates a dead front field computer with an integrated lightbar.

FIG. 1 illustrates one embodiment of a field computer 10. The field computer 10 includes a field computer housing 12. There is a display 14 shown and a frame 16 which borders or surrounds the display 14. The frame 16 may be a glass area which extends beyond the horizontal and vertical limits of an LCD. Several lighting elements 17 are shown which may be used for various functions such as to indicate that the device is receiving power. Lighting elements are also arranged to form a light bar 18, however, the presence of the lightbar is not apparent but remains hidden unless individual lighting elements within the lightbar are active. The term "dead front" may be used to describe the masking of opening on a cover glass area in a manner which camouflages the openings in the cover glass.

Figure 2:
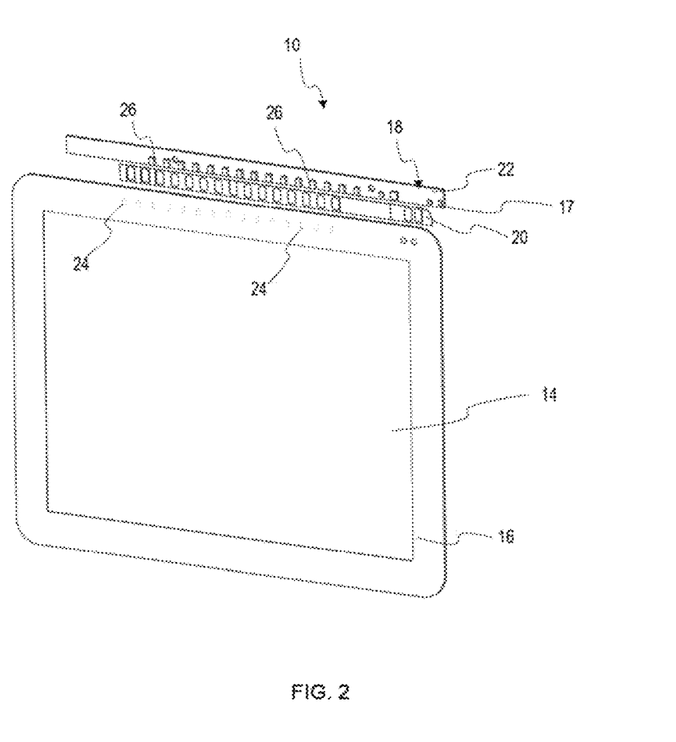
FIG. 2 is an exploded view of portions of a field computer.

FIG. 2 illustrates a further view of a field computer 10. The field computer 10 includes a circuit board 22 which has an array of a plurality of lighting elements 26 which form the light bar 18. Each of the lighting elements may be a light emitting diode (LED). A layer of diffusion film 20 is shown which is placed over the circuit board 22 with semi-transparent masks 24 aligned with corresponding lighting elements 26. The masks 24 are shapes which provide openings at the location of each lighting element within the array of lighting elements. The desired transparency allow the lighting elements to be seen through the openings when the lighting elements are illuminated. The diffusion film 20 may have texture applied in the location of each lighting element to diffuse and spread the light emitted to fill the desired semi-transparent shapes in the touchscreen glass. The diffusion film may also include an adhesive strip for bonding to the opposing side of the touchscreen glass and light absorbing areas applied between the lighting elements to prevent light bleed to adjacent lighting elements.

Note also that the touchscreen device with glass extending beyond the horizontal and vertical limits of the LCD. The extended glass area may have an opaque paint or spray coating applied to the opposing side with semi-transparent masks (shapes) at each LED location. In one embodiment material may be sprayed over or otherwise applied to the LED openings in order to provide a repeatable and reproducible amount of light. This application may be precisely controlled to allow the desired transparency through the openings with and without the lighting elements illuminated. Thus without the lighting elements being illuminated it is not apparent that the lighting elements are as even present, yet when the lighting elements are illuminated they can be clearly seen. Thus, attention is focused on the LCD screen when guidance is not enabled (lightbar indicator is off), and inversely, attention is only drawn to the lightbar when guidance is enabled (light bar indicator is on).

To provide the desired level of semi-transparency, the level of transmissivity may be in a range from 2 percent to 10 percent, or other appropriate range depending upon the particular lighting elements used and the brightness desired. During manufacture an appropriate amount of sprayed material may be used over the openings to result in a repeatable and reproducible amount of light which is transmissible through the spray coating. The amount of material should be heavy enough such as to hide or camouflage the openings in the cover glass when not in use, but not too heavy as to impede the light traveling through the openings when the lighting elements are illuminated. In addition, the lighting elements should be sufficiently bright to be sunlight viewable through the diffusion film and semi-transparent mask, but dimmable during nighttime use.

Figure 3:
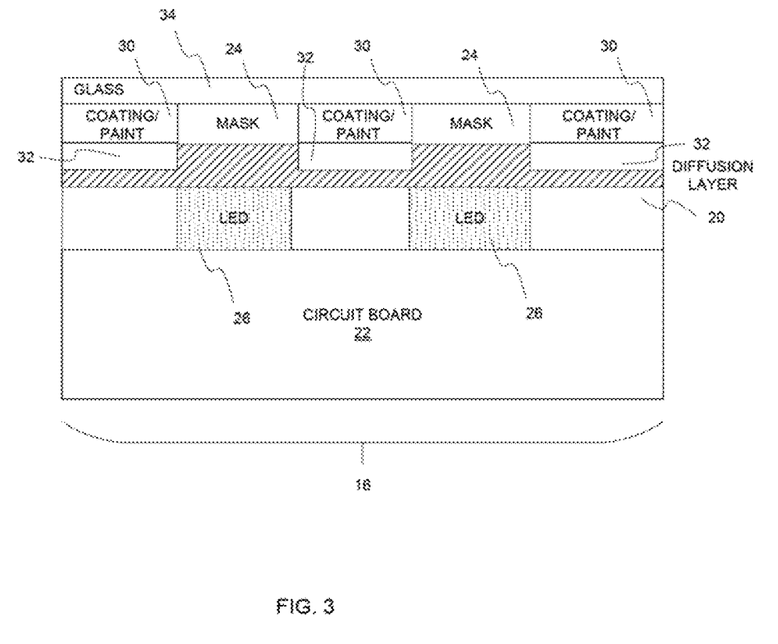
FIG. 3 illustrates a cross-section showing integration of an LCD touch panel and LEDs.

FIG. 3 illustrates a sectional view of one example. Note that the respective components are not presented to scale. For example, it is to be understood that the coating/paint or adhesive may be very thin layers. What is shown is merely to aid in description of an embodiment. As shown in FIG. 3, there is a layer of glass 34 which extends across both an LCD touch panel 14 and may be integrated therewith. The layer of glass 34 also extends over the frame area 16 where LEDs are positioned under the glass 34. The LEDs 26 may be mounted on a circuit board 22. A diffusion layer 20 is shown which may be formed of films and includes area over the LEDs 26. Adhesive 32 may be present to attach the diffusion film to the back of the glass 34 at positions not covering the LEDs 26. The glass 34 may be covered with opaque coating or paint 30 with mask areas 24 corresponding to locations of the LEDs 26.

Figure 4:
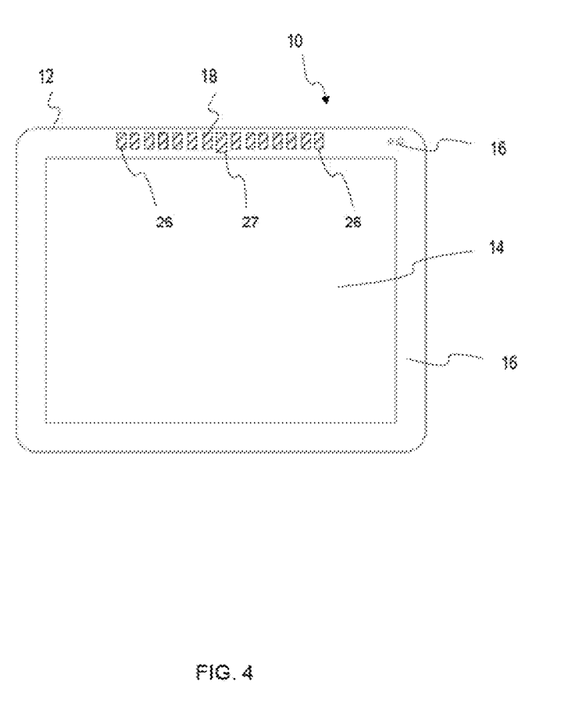

FIG. 4 illustrates one example of the agriculture field computer 10 with all LEDs 26 within the light bar 18 lit up. Note, this is merely to illustrate that each of the LEDs may potentially be visible. In typical operation, the centermost LED 27 (and possibly immediately adjacent LEDs) will be lit when the vehicle is on a desired path. The centermost LED 27 and/or the mask associated therewith may be sized or shaped differently or offset in one or more directions to make it more prominent than other LEDs within the light bar 18. The particular subset of LEDs that are lit at any given time may be dependent upon how well the current path tracks with a desired path and so the subset of LEDs that are lit may be to the right or to the left of center. It should be understood that any number of different LEDs may be present, preferably three or more with the number used based in part on the particular application.

The agricultural field computer may vary in size, such as by having a display size of 12.1", 8.4", 7", or other appropriate size. The agricultural field computer may provide for lightbar guidance, mechanical assisted steering, hydraulic automated steering, or provide other appropriate guidance and steering features. For example, it may provide visual feedback to the user for manually steering the tractor, applicator, or harvester vehicle along a calculated path. Alternatively, it may provide feedback to the position of the vehicle relative to the calculated path of travel in an automated steering system. Of course, the present invention is not to be limited to the specific examples of uses described herein.

Figure 5:
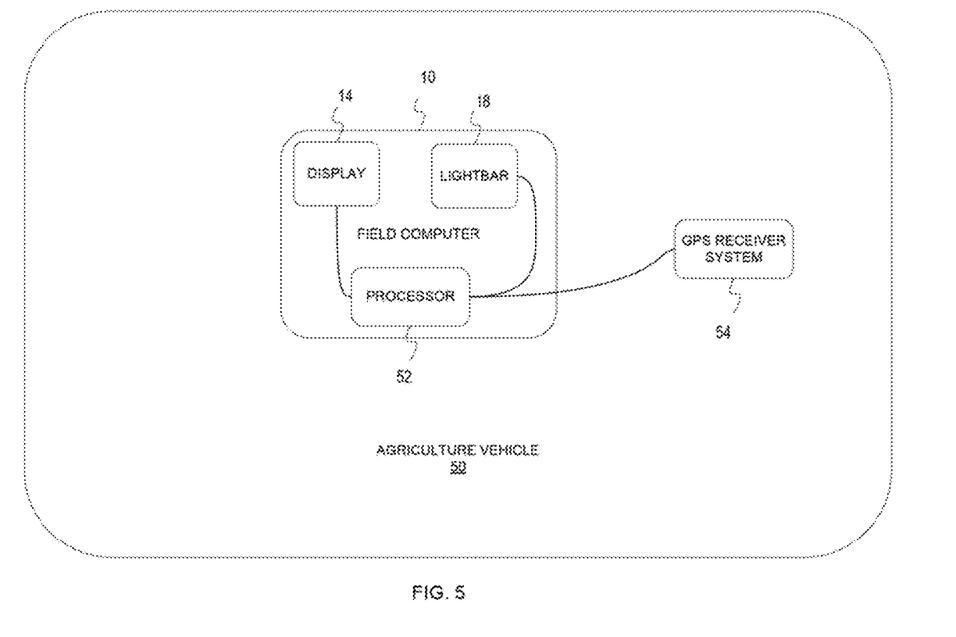
FIG. 5 is a diagram illustrating a field computer within an agricultural vehicle.

FIG. 5 is a diagram illustrating an agriculture vehicle 50 in which the field computer 10 is located. The field computer includes a processor 52. A GPS receiver system 54 may be operatively connected to the processor 52. As previously explained, the field computer 10 includes a display 14 (which may be a touchscreen LCD) and a lightbar 18 which may both be operatively connected to the processor 52. The display 14 and lightbar 18 are both integrated into the field computer which has a deadfront as previously explained.

The lightbar shown and described throughout may be used for different purposes. For example, the light bar may be used as a user interface feature to indicate system performance or provide feedback for various purposes, such as to provide vehicle position relative to a calculated path for guidance.

It should also be understood that the lightbar may be horizontal, vertical, or as otherwise aligned relative to the housing. The orientation of the lightbar may vary based on the particular application of which it is used. Similarly, the number of LEDs present may vary. Thus, for example, three LEDs or more may be present. The number of LEDs present may depend upon the particular application. For example, in some applications there may be a separate LED for each row unit of an agricultural vehicle (e.g. 12, 16, 24, 36, 48, 54, etc.).

Where a single field computer is provided for multiple uses, there may be multiple lightbars present which may have the same or different orientations. Thus, for example, there may be both a horizontal lightbar present and a vertical lightbar present. One application of a vertical lightbar would be as an indicator for tile depth control or surface grading.

Therefore, an improved field computer for use in an agricultural vehicle has been shown and described. Although specific embodiments have been shown, variations, options, and alternatives are contemplated. These include variations in the size, shape, level of transmissivity associated with masks, the specific materials used, the type of lighting elements, the number of lighting elements, the functionality of the agriculture field computer and other variations, options, and alternatives.

What is claimed is:

1. A field computer for use in an agricultural vehicle, the field computer comprising:
   a housing comprising a frame;
   a processor disposed within the housing;
   a touchscreen display operatively connected to the housing and the processor, the frame bordering the touchscreen display and integrated with a layer of glass extending both over the touchscreen display and beyond the touchscreen display and over the frame extending to each outside edge of the housing to provide an extended glass area, the layer of glass forming a planar outer surface from outside edge to outside edge of the housing of the field computer;
   a LED light bar comprising a plurality of LED lighting elements arranged in a line on the field computer, the LED light bar positioned along a portion of the frame and integrated therein;
   wherein the LED lighting elements of the LED light bar are positioned such that the LED lighting elements of the LED light bar remain hidden when not in use using masking associated with the LED lighting elements of the LED light bar to mask presence of the LED lighting elements of the LED light bar unless the LED lighting elements of the LED light bar are illuminated;
   wherein a first mode of operation when guidance is not enabled, the LED light bar is off and the LED light bar is hidden from an operator;
   wherein a second mode of operation when guidance is enabled, the LED light bar is on with one or more of the LED lighting elements visibly illuminated; and
   wherein the field computer is configured to provide feedback associated with operation of the agricultural vehicle by lighting one or more of the LED lighting elements of the LED light bar.

2. The field computer of claim 1 wherein the line is a horizontal row.

3. The field computer of claim 1 wherein the feedback comprises variance from a desired parameter.

4. The field computer of claim 3 wherein the desired parameter is a desired path.

5. The field computer of claim 3 wherein the desired parameter is a desired depth.

6. The field computer of claim 3 wherein the desired parameter is a desired grade.

7. The field computer of claim 1 wherein the touchscreen display includes a liquid crystal display (LCD) panel.

8. The field computer of claim 1 further comprising opaque paint applied to the extended glass area with the masking comprising semi-transparent masks at locations for the LED lighting elements of the LED light bar to allow for light to be emitted from the LED lighting elements of the LED light bar through the semi-transparent masks.

9. The field computer of claim 8 further comprising diffusion film applied at the locations for the LED lighting elements of the LED light bar to diffuse and spread light emitted.

10. A field computer for use in an agricultural vehicle, the field computer comprising:
    a housing comprising a frame;
    a processor disposed within the housing;
    a touchscreen display operatively connected to the housing and the processor and forming a front of the field computer;

a LED light bar comprising a plurality of LED lighting elements arranged in a line on the field computer, the LED light bar positioned along a portion of the frame and integrated therein;

a layer of glass forming a surface of the touchscreen display and the frame extending to each outer edge of the housing;

masking associated with the LED lighting elements to mask presence of the LED lighting elements unless the LED lighting elements are illuminated;

wherein a first mode of operation when guidance is not enabled, the LED light bar is off and the LED light bar is masked from an operator;

wherein a second mode of operation when guidance is enabled, the LED light bar is on with one or more of the LED lighting elements visibly illuminated; and wherein the field computer is configured to provide feedback associated with operation of the agricultural vehicle by lighting one or more of the LED lighting elements in the LED light bar.

11. The field computer of claim 10 wherein the touchscreen display includes a liquid crystal display (LCD) panel behind the layer of glass.

12. The field computer of claim 11 further comprising opaque paint applied to a portion of the layer of glass over the frame and semi-transparent masks at locations for the LED lighting elements of the LED light bar to allow for light to be emitted from the LED lighting elements of the LED light bar through the semi-transparent masks.

13. The field computer of claim 12 further comprising diffusion film applied at the locations for the LED lighting elements of the LED light bar to diffuse and spread light emitted.

14. The field computer of claim 10 wherein the line is a horizontal row or a vertical row.

15. The field computer of claim 10 wherein the feedback comprises variance from a desired parameter.

16. The field computer of claim 15 wherein the desired parameter is a desired path.

17. The field computer of claim 15 wherein the desired parameter is a desired depth.

18. The field computer of claim 15 wherein the desired parameter is a desired grade.

* * * * *